(12) United States Patent
Liu et al.

(10) Patent No.: US 12,499,522 B2
(45) Date of Patent: Dec. 16, 2025

(54) METHOD IN IMAGE PROCESSING FOR REMOVAL OF GENERAL DISTORTIONS AND ELECTRONIC DEVICE

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 361 days.

(21) Appl. No.: 18/094,496

(22) Filed: Jan. 9, 2023

(65) Prior Publication Data

US 2023/0394634 A1 Dec. 7, 2023

(30) Foreign Application Priority Data

Jun. 7, 2022 (CN) .......................... 202210639621.9

(51) Int. Cl.
*G06T 5/80* (2024.01)
(52) U.S. Cl.
CPC ...... *G06T 5/80* (2024.01); *G06T 2207/20081* (2013.01); *G06T 2207/20084* (2013.01)
(58) Field of Classification Search
CPC ............. G06T 5/80; G06T 2207/20081; G06T 2207/20084
USPC ........................................................ 382/275
See application file for complete search history.

(56) References Cited

FOREIGN PATENT DOCUMENTS

| CN | 110570373 | 12/2019 |
| CN | 110674815 | 1/2020 |
| CN | 113658274 | 11/2021 |

OTHER PUBLICATIONS

Pei, Yanting, et al. "Effects of image degradation and degradation removal to CNN-based image classification." IEEE transactions on pattern analysis and machine intelligence 43.4 (2019): 1239-1253. (Year: 2019).*
Cai, Bolun, et al. "DehazeNet: An End-to-End System for Single Image Haze Removal." arXiv preprint arXiv:1601.07661 (2016). (Year: 2016).*
Liu, Qiankun, et al. "Reduce Information Loss in Transformers for Pluralistic Image Inpainting." arXiv preprint arXiv:2205.05076 (2022). (Year: 2022).*

* cited by examiner

*Primary Examiner* — Jonathan S Lee
(74) *Attorney, Agent, or Firm* — ScienBiziP, P.C.

(57) ABSTRACT

A method for processing images to remove distortions of various types without requiring retraining for per-type processing models, applied in an electronic device, establishes a distortion removal model, and inputs distorted images in the distortion removal model. General distortions are removed by the distortion removal model and the restored images are input into a deep learning model for final image processing. The deep learning model of the present disclosure finally corrects distortion in the images so that distortion-free images are obtained.

20 Claims, 7 Drawing Sheets

METHOD IN IMAGE PROCESSING FOR REMOVAL OF GENERAL DISTORTIONS AND ELECTRONIC DEVICE

This application claims priority to Chinese Patent Application No. 202210639621.9 filed on Jun. 7, 2022, in China State Intellectual Property Administration, the contents of which are incorporated by reference herein.

FIELD

The subject matter herein generally relates to an image processing technology field, in particular, relates to a method in imaging processing for removal of general distortions and an electronic device.

BACKGROUND

Cameras, such as roadside cameras, reversing cameras, mobile phone cameras, etc., are found everywhere today, to obtain images, for image processing functions such as target capture, target recognition, and even tracking. However, the images obtained by such cameras may have distortions, and the types of distortions can be very different, each having a certain impact on image processing.

At present, a corresponding image processing model can be constructed for each type of distortions, so that each image processing model is dedicated to image processing for images of a certain type of distortions. However, such approach requires construction of multiple image processing models, and requires many types of image processing models. When one image processing model is used to implement an image processing function, the entire image processing models need to be retrained. The training process of the image processing models requires large data processing, and there is no guarantee that training process of each of the image processing models will converge successfully.

BRIEF DESCRIPTION OF THE DRAWINGS

Implementations of the present disclosure will now be described, by way of embodiment, with reference to the attached figures.

DETAILED DESCRIPTION

Figure 1:
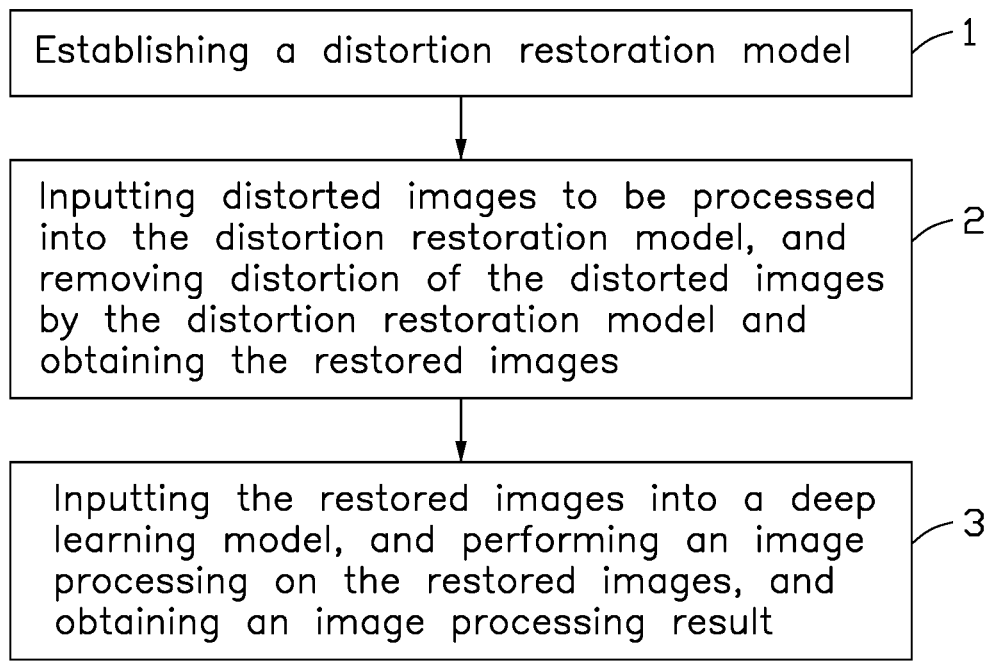
FIG. 1 is a flowchart of one embodiment of a method in imaging processing for removal of general distortions.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

FIG. 1 illustrates a method in imaging processing for removal of general distortion. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized without departing from this disclosure. The example method can begin at block 1.

At block 1, establishing a distortion removal model.

In one embodiment, the distortion removal model is used to remove distortion from distorted images. In one embodiment, a distortion degree of and a distortion type of distortion of the distorted images are not limited. In one embodiment, the distortion restoration model can remove any distortion type and distortion degree of the distorted images.

In one embodiment, the distortion degree refers to a distortion degree of an image, namely, the distortion degree is a distortion rate. In one embodiment, the distortion type refers to a direction in which the image is distorted or deformed, namely, the distortion type refers to a direction of the position deviation of the pixels of the image.

In one embodiment, the distortion type can be a radial distortion of the image, in which the pixel points from a central part of the image deviate from the ideal and follow a radial direction. In one embodiment, the radial distortion includes pincushion distortion and barrel distortion. In another embodiment, the distortion type can be a tangential distortion of the image, in which the deviating pixels from a central part of the image follow a tangential direction.

Figure 2:
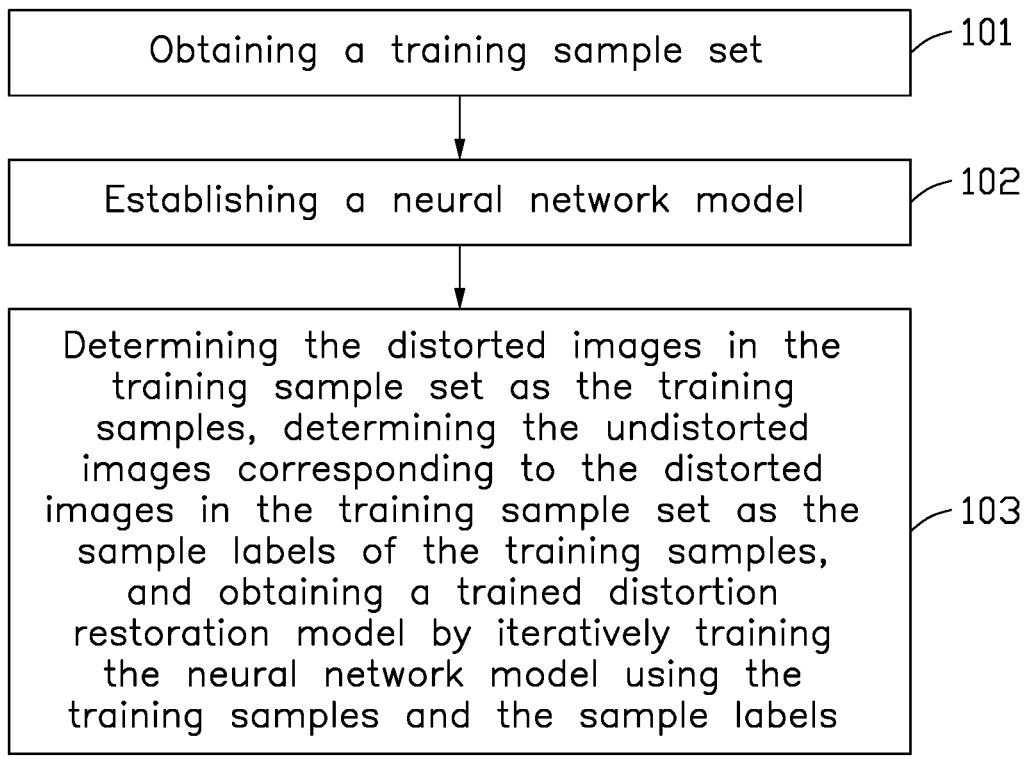
FIG. 2 is a flowchart of one embodiment of a method for establishing a distortion removal model.

FIG. 2 illustrates a flowchart of a method for establishing the distortion removal model. The method for establishing the distortion restoration can begin at block 11.

At block 101, obtaining a training sample set.

In one embodiment, the training sample set includes undistorted images and images after being distorted. The undistorted images and the distorted images may be images in the same color space, for example, both the undistorted images and the distorted images are RGB images. Different distorted images have different degrees and types of distortion.

Figure 3:
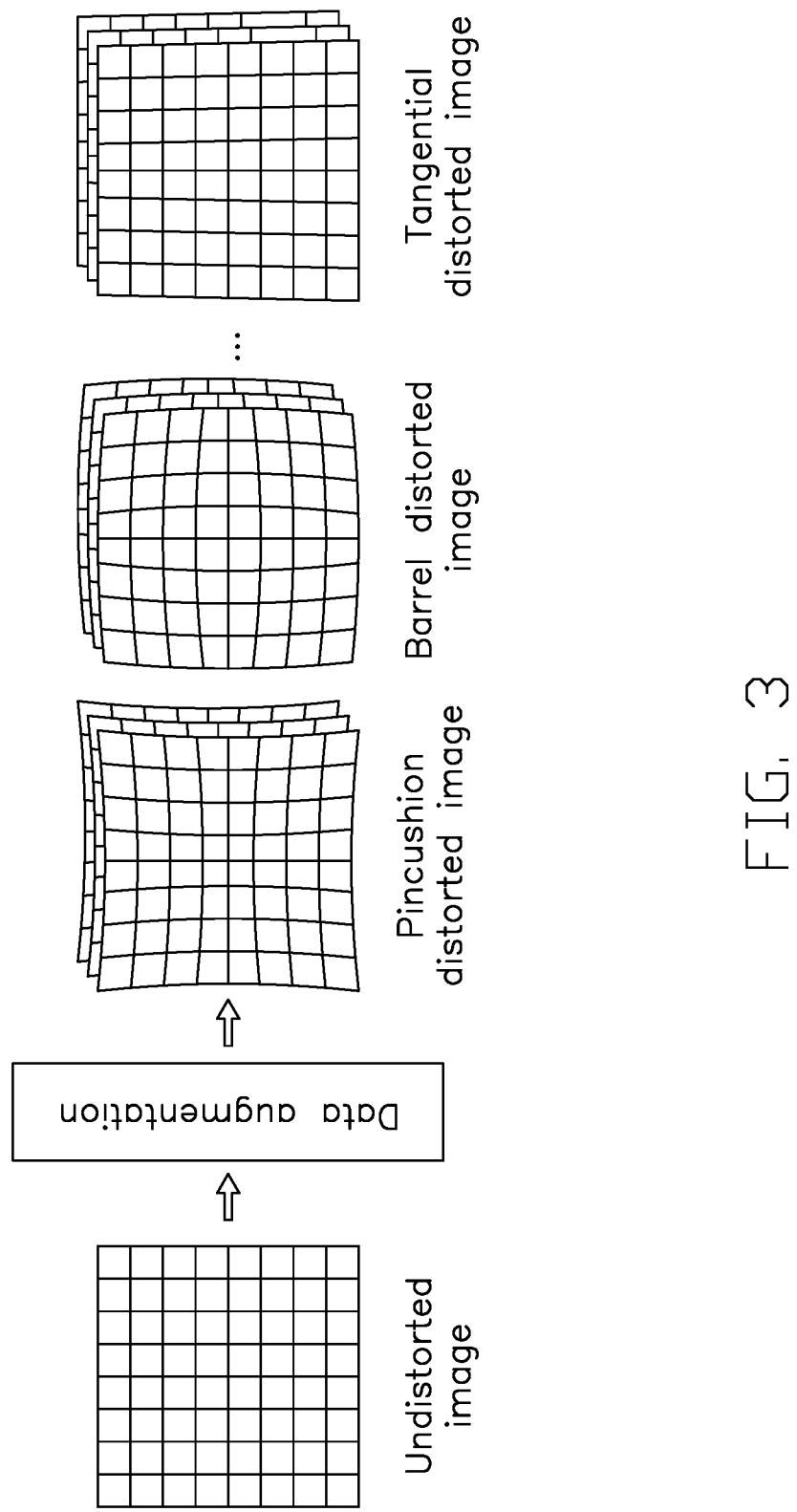
FIG. 3 is a schematic diagram showing data augmentation for the distortion removal model.

In one embodiment, the training sample set is obtained by data augmentation of undistorted images. The data augmentation includes distorting the undistorted image by a distorting formula, so as to obtain the distorted image corresponding to the undistorted image. Referring to FIG. 3, after the undistorted image is distorted by the distorting formula, pincushion distorted images, barrel distorted images, and tangential distorted images are obtained.

In one embodiment, when the distortion type is the radial distortion, the formula for distorting an image to correspond to the radial distortion is:

$$\begin{cases} x_u = x_d(1 + \lambda_1 r_d^2 + \lambda_2 r_d^4 + \ldots + \lambda_N r_d^{2N}) \\ y_u = y_d(1 + \lambda_1 r_d^2 + \lambda_2 r_d^4 + \ldots + \lambda_N r_d^{2N}) \\ r_d = \sqrt{(x_d - x_0)^2 + (y_d - y_0)^2} \end{cases}$$

$(x_d, y_d)$ is a coordinate of a pixel point in the distorted images, $(x_u, y_u)$ is a coordinate of a pixel point in the undistorted images; $(x_0, y_0)$ is a coordinate of a distortion center of the distorted images, $\lambda_1, \lambda_2 \ldots \lambda_N$ are radial distortion coefficients, and N is a positive integer, the value of N depending on refinement requirements of the distortion removal model. The greater the value of N, the greater the number of radial distortion coefficients. $r_d$ is a distance between the pixel points in the distorted images and the distortion center.

In one embodiment, when the distortion type is tangential distortion, the distortion formula corresponding to the tangential distortion is:

$$\begin{cases} x_u = x_d[(2\mu_1 x_u y_u + \mu_2(r_d^2 + 2x_u^2)] \\ y_u = y_d[(2\mu_2 x_u y_u + \mu_1(r_d^2 + 2y_u^2)] \\ r_d = \sqrt{(x_d - x_0)^2 + (y_d - y_0)^2} \end{cases}$$

$(x_d, y_d)$ is the coordinate of the pixel point in the distorted images, $(x_u, y_u)$ is the coordinate of the pixel point in the undistorted images; $(x_0, y_0)$ is the coordinate of the distortion center of the distorted images, and $\mu_1, \mu_2$ are tangential distortion coefficients. $r_d$ is the distance between the pixel points in the distorted images and the distortion center.

In one embodiment, the coordinates of each pixel point in the undistorted image are substituted into the distortion formula, the coordinates of the corresponding pixel points in the distortion images can be obtained, and the distorted images can be generated.

In one embodiment, the pixel points in the undistorted images are substituted into different distortion formulas, the distortion direction of the undistorted images can be changed, thereby obtaining distorted images of different distortion types. By changing the radial distortion coefficient or tangential distortion coefficient, a degree of the radial distortion or a degree of the tangential distortion can be changed, that is, the distortion rate can be changed, so as to obtain distorted images with different distortion degrees. In one embodiment, by changing distortion direction of the undistorted images, the distorted images of different distortion types are obtained; or by changing the distortion rate of the undistorted images, the distorted images with different distortion degrees are obtained.

At block 102, establishing a neural network model.

In one embodiment, a structure of the neural network model is not limited. In one embodiment, the neural network model is established according to an architecture of an autoencoder (AE). In one embodiment, the neural network model includes an encoder and a decoder.

In one embodiment, the encoder includes a convolutional layer and a maximum pooling layer. The convolutional layer changes a depth of input data, and the maximum pooling layer reduces dimensions of the input data and retains effective information of the input data. In one embodiment, the encoder compressed the input data into a low-dimensional feature vectors. The decoder includes a convolution layer and an upsampling layer. The upsampling layer can resample and interpolate the input data to increase the dimensions of the input data. The decoder can be used to reconstruct the input data.

At block 103, determining the distorted images in the training sample set as the training samples, determining the undistorted images corresponding to the distorted images in the training sample set as the sample labels (that is, ground truth) of the training samples, and obtaining a trained distortion removal model by iteratively training the neural network model using the training samples and the sample labels.

Figure 4:
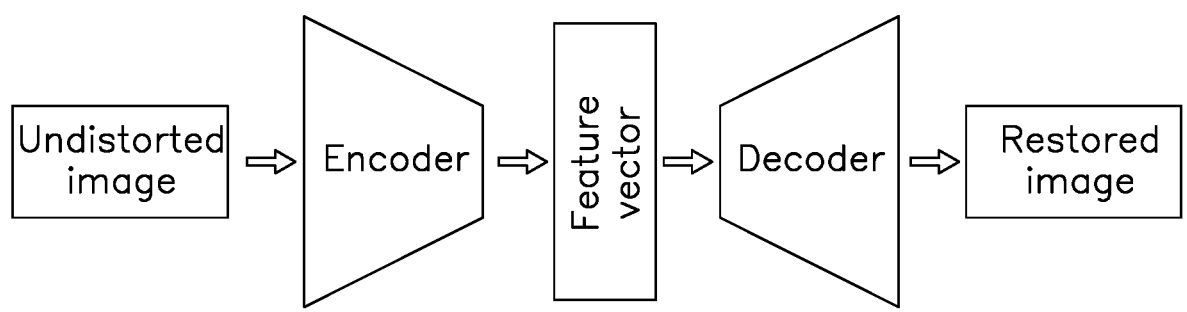
FIG. 4 is a schematic diagram showing distortion-removal processes of the distortion removal model.

In one embodiment, the encoder and the decoder of the neural network model are trained by using gradient descent method. Referring to FIG. 4, each of the training samples is input into the encoder, the encoder compresses the training sample and reduces the dimension of the training sample, and outputs feature vectors corresponding to the training sample. The feature vectors are input into the decoder, and the decoder restores the feature vectors and outputs restored image of the training sample corresponding to the feature vectors. A difference between the restored image and the sample label of the training sample is determined as a loss function, and the encoder and the decoder do back-propagation training according to the loss function, and the trained neural network model is finally obtained. The trained neural network model is the distortion removal model.

In one embodiment, considering that distortion of the distorted images will cause deviation in color, the loss function L1 is established as follows: $L1=|R_1-R_2|+|G_1-G_2|+|B_1-B_2|$, the loss function L1 represents a loss value of a color vector between one restored image and one undistorted image; R, G, and B represent the color vectors in the RGB color space; a subscript 1 represents the restored image, and a subscript 2 represents the undistorted image.

Figure 5:
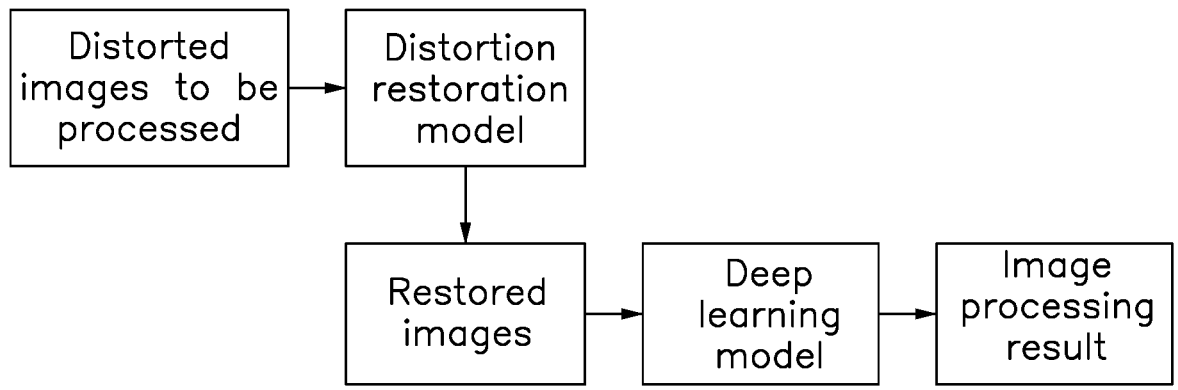
FIG. 5 is a schematic diagram showing processes of distorted images.

At block 2, inputting distorted images to be processed into the distortion removal model, and removing distortion of the distorted images by the distortion removal model and obtaining the restored images (refer to FIG. 5).

In one embodiment, the distorted images to be processed can be original images captured by various cameras (such as roadside cameras, reversing cameras, mobile phone cameras, etc.), or the distorted images can be images after preprocessing is applied to the original images. In one embodiment, the preprocessing of original images refers to a center of the original images being taken as the origin for cropping, and the original images are cropped to the image size set by the encoder, simplifying information of the original images and improving reliability of feature extraction by the encoder.

At block 3, inputting the restored images into a deep learning model, and performing image processing on the restored images, and obtaining an image processing result.

In one embodiment, since the deep learning model takes an output of the distortion reduction model as an input, the restored image output by the distortion reduction model therefore needs to meet the requirements of the deep learning model for the input images.

In one embodiment, the method further includes: storing or displaying the image processing result.

In one embodiment, considering that removal of distortion from the distorted images is realized by the distortion removal model, the deep learning model does not require an ability to cancel distortion, and when the distortion rate of the restored images goes beyond the ability of the deep learning model in terms of degree of distortion, then the distortion of the restored images will interfere with the image processing results of the deep learning model. Therefore, the distortion removal model needs to be trained according to the distortion rate range of the input images set by the deep learning model, so that the distortion rate of the restored images output by the trained distortion reduction model is within a distortion rate range of the input images set by the deep learning model, to ensure that a final image result is not affected by distortion of the restored images.

In one embodiment, the functions of the image processing of the deep learning model are not limited. The image processing can include an image classification function, an image detection function, an image segmentation function, etc.

In one embodiment, the deep learning model may use a pre-trained deep learning model, such as a pre-trained convolutional neural network model. It can be understood that since the convolutional neural network model is trained with a large amount of data in advance, the parameters of each layer of the deep learning model are already configured, and it will have the ability to extract shallow basic features and deep abstract features, so there is no need to start training from scratch, it can be used directly.

In one embodiment, a type of the deep learning model is not limited, for example, the deep learning model can be any of models such as AlexNet, VGGNet, GoogLeNet, ResNet, DenseNet, SSDNet, RCNN, YOLO series network, FCN, SegNet, etc. In one embodiment, the deep learning model adopts the ResNet model to classify objects in the restored images. In another embodiment, the deep learning model adopts the RCNN model to detect whether the restored images contain a target object. In another embodiment, the deep learning model adopts the FCN model to segment the target object in the restored images.

In one embodiment, the deep learning model can also be a model obtained by fine-tuning a pre-trained convolutional neural network model. Fine-tuning the pre-trained convolutional neural network model means that the convolutional neural network model can perform the required image processing functions.

It can be understood that compared with the need to train a new model from scratch, the amount of data processing in using an existing model is greatly reduced, therefore effectively saving computing time and computing resources, and improving the efficiency of image processing.

In present disclosure, when an image is processed, the distortion of the image is first removed by the distortion removal model, so that the distortion rate of the image output by the distortion removal model is kept within the range of the image distortion rate set by the deep learning model, and then the deep learning model is used to correct the image distortion. Then, a de-distorted image is processed by the deep learning model, so that the purpose of image processing can be achieved, and at the same time, the image processing result is protected from being affected by distortion, and effective image processing is ensured.

Compared with existing image processing method, which needs to retrain a model for each distortion type, the image processing method of the present disclosure can adapt to the distortion of various distortion types and degrees of distortion, and a deep learning model does not need to be trained from scratch for each distortion type, so the training volume of the deep learning model is reduced, the efficiency of the image processing improved and computing resources saved. The repetition of excessive training volumes of the deep learning model and failures in training are also avoided.

Figure 6:
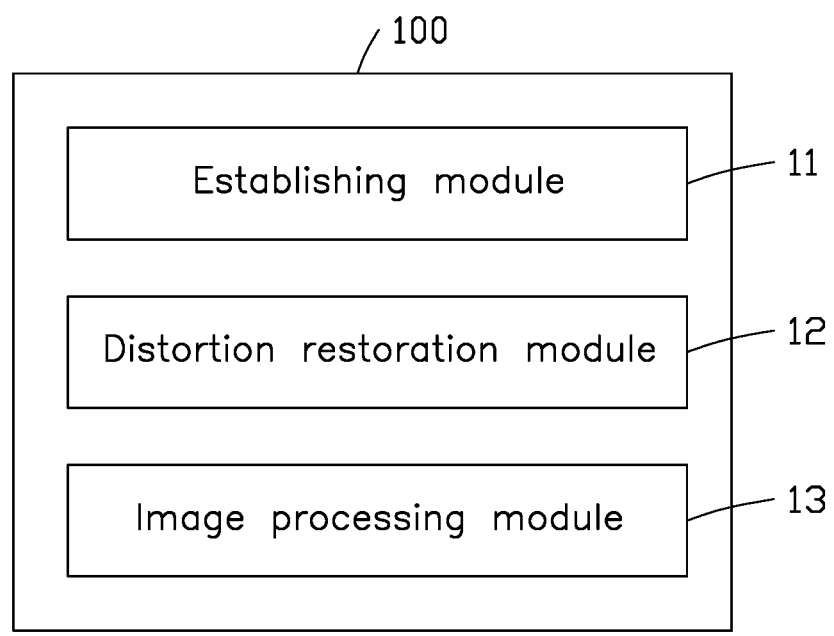
FIG. 6 is a schematic diagram of one embodiment of an image processing system.

FIG. 6 illustrates an image processing system 100. The image processing system 100 is used to implement the above method.

In one embodiment, the image processing system 100 includes an establishing module 11, a distortion restoration module 12, and an image processing module 13.

The establishing module 11 establishes a distortion removal model, and removes distortion of distorted images by the distortion removal model.

The distortion restoration module 12 inputs distorted images to be processed into the distortion removal model, and removes distortion of the distorted images to obtain the restored images without distortion.

The image processing module 13 inputs the restored images into the deep learning model, and performs image processing on the restored images, to obtain an image processing result.

In one embodiment, the deep learning model in the image processing module 13 adopts a pre-trained deep learning model. It can be understood that the distortion rate of the restored images output by the distortion removal model is within the image distortion rate range set by the deep learning model.

In one embodiment, the present disclosure also provides a non-transitory storage medium. The non-transitory storage medium stores a plurality of instructions which can be loaded and executed by a processor to implement the above method in imaging processing for removal of general distortion.

Figure 7:
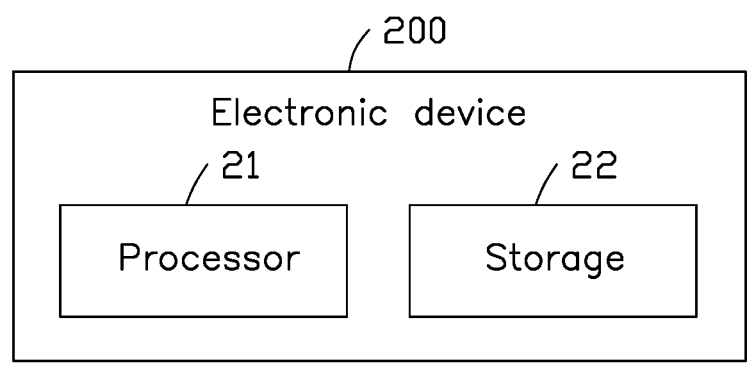
FIG. 7 is a schematic diagram of one embodiment of an electronic device.

FIG. 7 illustrates the electronic device 200. The electronic device 200 may include at least one processor 21 and a storage 22, for example, a non-transitory storage medium. The storage 22 is used to store a plurality of logical instructions. The processor 21 can execute the logical instructions to execute the above method that can adapt to any distortion.

The above-mentioned logic instructions in the storage 22 can be implemented in the form of software functional units and can be stored in a non-transitory storage medium when sold or used as an independent product.

The storage 22 may be configured to store software programs and computer-executable programs, such as program instructions corresponding to the method in the embodiments of the present disclosure or modules in the image processing system 100. The processor 21 executes functional applications and image processing by running software programs, instructions or modules stored in the storage 22, that is, to implement the method in imaging processing for removal of general distortion.

In one embodiment, electronic device 200 includes, but is not limited to, a mobile terminal device, a Road Side Unit (RSU), and a robot. In one embodiment, the mobile terminal devices include smart phones, tablets, notebook computers, and car PCs. The images to be processed in respect of distortion are the original images captured by the camera that comes with electronic equipment, or the original images after image cropping and other preprocessing.

In one embodiment, the storage 22 includes non-volatile computer-readable storage, such as a magnetic disk, memory, and the like. It can be understood that the storage 22 may also include other non-volatile computer-readable storage, such as a plug-in hard disk, a Smart Media Card (SMC), a Secure Digital (SD) card, a Flash Card, at least one flash memory device and/or other non-volatile solid state storage device.

In one embodiment, the processor 21 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The processor 22 is the control center of the electronic device 200, using various interfaces and lines to connect various parts of the entire electronic device 200.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method in imaging processing for removal of general distortions, the method comprising:
    establishing a distortion removal model;
    cropping distorted images to an image size set by an encoder of a deep learning mode, wherein the encoder comprises a convolutional layer and a maximum pooling layer, the convolutional layer changes depth of the distorted images, and the maximum pooling layer reduces dimensions of the distorted images and retains effective information of the distorted images;
    inputting the distorted images into the distortion removal model, and obtaining restored images by removing distortions of the distorted images by the distortion removal model and by making a distortion rate of the distorted images within a distortion rate range set by the deep learning model;
    inputting the restored images into the deep learning model, and performing an image processing on the restored images, and obtaining an image processing result.

2. The method as claimed in claim 1, wherein a distortion rate of the restored images is within a distortion rate range of the input images set by the deep learning model.

3. The method as claimed in claim 1, wherein establishing the distortion removal model comprises:
    obtaining a training sample set, the training sample set comprising undistorted images and distorted images corresponding to the undistorted images after being distorted, and the distorted images having different distortion degrees and/or distortion types;
    establishing a neural network model;
    determining the distorted images in the training sample set as training samples, determining the undistorted images corresponding to the distorted images as sample labels of the training samples, and obtaining the distortion removal model by training the neural network model using the training samples and the sample labels.

4. The method as claimed in claim 3, wherein training the neural network model by using the training samples and the sample labels comprises:
    inputting the training samples into an encoder of the neural network model, compressing the training samples and reducing dimensions of the training samples by the encoder, and outputting feature vectors corresponding to the training samples;
    inputting the feature vectors into a decoder of the neural network model, and restoring the feature vectors and outputting the restored images of the training samples corresponding to the feature vectors by the decoder; and
    determining differences between the restored images and the sample labels of the training samples as a loss function, and performing a backpropagation training on the encoder and the decoder according to the loss function, and obtaining a trained neural network model.

5. The method as claimed in claim 3, wherein the training sample set is obtained by data augmentation of the undistorted images.

6. The method as claimed in claim 5, further comprising:
    performing a distortion processing on the undistorted images and obtaining the distorted images corresponding to the undistorted images by:
    changing a distortion direction of the undistorted images and obtaining the distorted images in different distortion types; and
    changing the distortion rate of the undistorted images, and obtaining the distorted images with different distortion degrees.

7. The method as claimed in claim 1, wherein the deep learning model is a pre-trained convolutional neural network model.

8. An electronic device comprising:
    a processor; and
    a non-transitory storage medium coupled to the processor and configured to store a plurality of instructions, which cause the processor to:
    establish a distortion removal model;
    crop distorted images to an image size set by an encoder of a deep learning mode, wherein the encoder comprises a convolutional layer and a maximum pooling layer, the convolutional layer changes depth of the distorted images, and the maximum pooling layer reduces dimensions of the distorted images and retains effective information of the distorted images;
    input the distorted images into the distortion removal model, and obtaining restored images by removing distortion of the distorted images by the distortion removal model and by making a distortion rate of the distorted images within a distortion rate range set by the deep learning model;
    input the restored images into the deep learning model, and perform an image processing on the restored images, and obtain an image processing result.

9. The electronic device as claimed in claim 8, wherein a distortion rate of the restored images is within a distortion rate range of the input images set by the deep learning model.

10. The electronic device as claimed in claim 8, wherein the plurality of instructions are further configured to cause the processor to:
    obtain a training sample set, the training sample set comprising undistorted images and distorted images corresponding to the undistorted image after being distorted, and the distorted images having different distortion degrees and/or distortion types;
    establish a neural network model;
    determine the distorted images in the training sample set as training samples, determine the undistorted images corresponding to the distorted images as sample labels of the training samples, and obtain the distortion removal model by training the neural network model using the training samples and the sample labels.

11. The electronic device as claimed in claim 10, wherein the plurality of instructions are further configured to cause the processor to:
    input the training samples into an encoder of the neural network model, compress the training samples and reduce dimensions of the training samples by the encoder, and output feature vectors corresponding to the training samples;

input the feature vectors into a decoder of the neural network model, and restore the feature vectors and output the restored images of the training samples corresponding to the feature vectors by the decoder;

determine differences between the restored images and the sample labels of the training samples as a loss function, and perform a backpropagation training on the encoder and the decoder according to the loss function, and obtain a trained neural network model.

12. The electronic device as claimed in claim 10, wherein the training sample set is obtained by data augmentation of the undistorted images.

13. The electronic device as claimed in claim 12, wherein the training sample set is obtained by data augmentation of the undistorted images by:

performing a distortion processing on the undistorted images and obtaining the distorted images corresponding to the undistorted images, comprising:

changing distortion direction of the undistorted images and obtaining the distorted images in different distortion types; and changing the distortion rate of the undistorted images, and obtaining the distorted images with different distortion degrees.

14. The electronic device as claimed in claim 8, wherein the deep learning model is a pre-trained convolutional neural network model.

15. A non-transitory storage medium having stored thereon instructions that, in response that executed by at least one processor of an electronic device, causes the least one processor to execute instructions of a method in imaging processing for removal of general distortion, the method comprising:

establishing a distortion removal model;

cropping distorted images to an image size set by an encoder of a deep learning mode, wherein the encoder comprises a convolutional layer and a maximum pooling layer, the convolutional layer changes depth of the distorted images, and the maximum pooling layer reduces dimensions of the distorted images and retains effective information of the distorted images;

inputting the distorted images into the distortion removal model, and obtaining restored images by removing distortion of the distorted images by the distortion removal model and by making a distortion rate of the distorted images within a distortion rate range set by the deep learning model;

inputting the restored images into the deep learning model, and performing an image processing on the restored images, and obtaining an image processing result.

16. The non-transitory storage medium as recited in claim 15, wherein a distortion rate of the restored images is within a distortion rate range of the input images set by the deep learning model.

17. The non-transitory storage medium as recited in claim 15, wherein establishing the distortion removal model comprises:

obtaining a training sample set, the training sample set comprising undistorted images and distorted images corresponding to the undistorted image after being distorted, and the distorted images having different distortion degrees and/or distortion types;

establishing a neural network model;

determining the distorted images in the training sample set as training samples, determining the undistorted images corresponding to the distorted images as sample labels of the training samples, and obtaining the distortion removal model by training the neural network model using the training samples and the sample labels.

18. The non-transitory storage medium as recited in claim 17, wherein the training sample set is obtained by data augmentation of the undistorted images.

19. The non-transitory storage medium as recited in claim 18, wherein the method further comprises:

performing a distortion processing on the undistorted images and obtaining the distorted images corresponding to the undistorted images, comprising:

changing a distortion direction of the undistorted images and obtaining the distorted images in different distortion types; and changing the distortion rate of the undistorted images, and obtaining the distorted images with different distortion degrees.

20. The non-transitory storage medium as recited in claim 15, wherein training the neural network model by using the training samples and the sample labels comprises:

inputting the training samples into an encoder of the neural network model, compressing the training samples and reducing dimensions of the training samples by the encoder, and outputting feature vectors corresponding to the training samples;

inputting the feature vector into a decoder of the neural network model, and restoring the feature vectors and outputting the restored images of the training samples corresponding to the feature vectors by the decoder;

determining differences between the restored images and the sample labels of the training samples as a loss function, and performing a backpropagation training on the encoder and the decoder according to the loss function, and obtaining a trained neural network model.

* * * * *